United States Patent [19]
Smith, Jr.

[11] Patent Number: 5,201,801
[45] Date of Patent: Apr. 13, 1993

[54] AIRCRAFT GAS TURBINE ENGINE PARTICLE SEPARATOR

[75] Inventor: Leroy H. Smith, Jr., Cincinnati, Ohio

[73] Assignee: General Electric Company, Cincinnati, Ohio

[21] Appl. No.: 709,852

[22] Filed: Jun. 4, 1991

[51] Int. Cl.$^5$ ............................................. F02K 3/02
[52] U.S. Cl. .................................................. 60/226.1
[58] Field of Search .................... 60/39.092, 226.1; 55/306; 244/53 B

[56] References Cited

U.S. PATENT DOCUMENTS

| | | | |
|---|---|---|---|
| 3,528,246 | 9/1970 | Fischer | 60/226.1 |
| 3,536,414 | 10/1970 | Smith, Jr. | 415/211 |
| 3,611,724 | 10/1971 | Kutney | 60/226.1 |
| 3,979,903 | 9/1976 | Hull, Jr. et al. | 60/39.09 P |
| 4,055,042 | 10/1977 | Colley | 60/226.1 |
| 4,463,552 | 8/1984 | Monhaedt et al. | 60/226.1 |
| 4,881,367 | 11/1989 | Flatman | 60/39.07 |
| 4,900,221 | 2/1990 | Ciokajlo et al. | 60/226.1 |

FOREIGN PATENT DOCUMENTS

| | | | |
|---|---|---|---|
| 1417154 | 12/1975 | United Kingdom | 60/39.092 |
| 2070691 | 9/1981 | United Kingdom | 60/226.1 |
| 2165892 | 4/1986 | United Kingdom | 60/226.1 |

OTHER PUBLICATIONS

Final Report, "Energy Efficient Engine, Preliminary Design and Integration Studies" by Advanced Engineering and Technology Programs Department, General Electric Company, Prepared for National Aeronautics and Space Administration, Cleveland, Ohio; Sep. 1978, pp. 153, 155, 158, 159, 161.

Primary Examiner—Richard A. Bertsch
Assistant Examiner—Howard R. Richman
Attorney, Agent, or Firm—Douglas E. Erickson; Jerome C. Squillaro

[57] ABSTRACT

A front fan gas turbine engine subassembly which acts as a particle separator. The subassembly includes an aft-most row of full-size fan blades, a flow splitter, and a row of stator vanes. The flow splitter separates the fan exit air into a core engine airflow and a surrounding bypass airflow. The stator vanes each have a first portion disposed radially inward of, and longitudinally forward of, the leading edge of the flow splitter. The subassembly, in essence, has moved the leading edge of a conventional flow splitter aft without also moving the forward-most row of stator vanes aft. This means that particles which would strike a conventionally-positioned flow splitter and be reflected radially into the core engine airflow will instead miss the aft-moved leading edge of the flow splitter to radially outwardly bypass the core engine airflow.

2 Claims, 5 Drawing Sheets

AIRCRAFT GAS TURBINE ENGINE PARTICLE SEPARATOR

BACKGROUND OF THE INVENTION

The present invention relates generally to aircraft gas turbine engines, and more particularly to a front fan gas turbine engine subassembly which reduces the amount of particles ingested into the engine's compressor.

A gas turbine engine includes a core engine having a high pressure compressor to compress the air flow entering the core engine, a combustor in which a mixture of fuel and the compressed ar is burned to generate a propulsive gas flow, and a high pressure turbine which is rotated by the propulsive gas flow and which is connected by a larger diameter shaft to drive the high pressure compressor. A typical front fan gas turbine engine adds a low pressure turbine (located aft of the high pressure turbine) which is connected by a smaller diameter coaxial shaft to drive the front fan (located forward of the high pressure compressor) and which may also drive a low pressure compressor (located between the front fan and the high pressure compressor). The low pressure compressor sometimes is called a booster compressor or simply a booster. A flow splitter, located between the fan and the first (usually the low pressure) compressor, separates the air which exits the fan into a core engine airflow and a coaxially surrounding bypass airflow. The bypass airflow from the fan provides most of the engine thrust for the aircraft. Some of the engine thrust comes from the core engine airflow after it flows through the low and high pressure compressors to the combustor and is accelerated past the high and low pressure turbines and out the exhaust nozzle. The flow splitter has a radially inner wall which defines the radially outer wall of the low pressure compressor air flow path casing. The low pressure compressor has a row of radially inwardly extending stator vanes attached to the flow splitter at its radially inner wall near its leading edge, followed by a row of radially outwardly extending rotor blades attached to a disc or rotor (which is connected to the smaller diameter coaxial shaft driven by the low pressure turbine), followed by additional alternating stator vane and rotor blade rows. The airfoil-shaped rotor blades compress, and necessarily turn the air flow. The airfoil-shaped stator vanes compress the air flow and straighten the airflow for the next row of rotor blades. The first row of compressor stator vanes is placed ahead of the first row of compressor rotor blades to straighten the airflow from the fan rotor blades.

An aircraft gas turbine engine will produce more thrust per pound of fuel consumed and will operate more maintenance free if only pure air enters its compressor (whether the compressor consists of only a high pressure compressor or whether it also has a low pressure compressor or even an additional medium or intermediate pressure compressor). Unfortunately the air flowing through the front fan may include rain or ice which lowers the combustor's efficiency and the air may include dust, dirt, sand or other foreign particle matter which erodes the leading edges of the compressor's rotor blades and stator vanes further lowering the engine's efficiency and requiring blade and vane replacement. In engines having a low pressure compressor forward of the high pressure compressor, it is the high pressure compressor which suffers the greater wear. Also, the problem of liquid or solid particle ingestion by the compressor typically is more acute during engine operation on or near the ground such as during takeoff.

A known particle separation technique for fan gas turbine engines is to bleed off some of the compressed airflow, particularly from the radially outer wall of the compressor casing. However, bleeding off compressed airflow degrades engine performance. Additionally, computer simulations of the trajectories of dust size particles have shown they will not always be concentrated in the radially outer wall region of the compressor airflow.

Another known particle separation technique for fan gas turbine engines is to add a row of "quarter-stage" rotor blades before the flow splitter. Such blades tend to centrifugally throw particles into the bypass airflow thereby avoiding the core engine airflow compressor rotor blades. However, such "quarter-stage" rotor blades add some additional weight and length to the engine, and the "quarter-stage"-compressed airflow which bypasses the core engine extracts an engine performance penalty (as in the case of the bleed particle separation arrangement).

SUMMARY OF THE INVENTION

It is an object of the invention to provide a front fan gas turbine engine subassembly for improved particle separation.

The invention provides a front fan gas turbine engine subassembly which includes an aft-most row of generally radially outwardly extending full-size front fan rotor blades and a flow splitter whose leading edge is positioned longitudinally aft of the fan rotor blades for separating air exiting therefrom into a core engine airflow and a coaxially surrounding bypass airflow. The subassembly also includes a row of stator vanes each having a first portion positioned longitudinally adjacent, radially inward of, and longitudinally forward of the flow splitter's leading edge and positioned longitudinally adjacent the fan rotor blades.

The subassembly, in essence, has moved the leading edge of a conventional flow splitter aft, without also moving the forward-most row of compressor stator vanes aft which would add unwanted weight and length to the engine. Computer simulations of the trajectories of dust size particles have shown that they will have a longitudinally aft component and a radially outward component of velocity and that they will miss the leading edge of the aft-moved flow splitter. Such particles will radially outwardly bypass the compressor rotor blades.

Several benefits and advantages are derived from the front fan gas turbine engine subassembly of the invention. Particle separation is achieved without bleeding off any compressed airflow which would degrade engine performance. Additionally, such particle separation is achieved without the use of additional components, such as "quarter-stage" rotor blades, which would add unwanted weight and length to the engine.

BRIEF DESCRIPTION OF THE DRAWINGS

The accompanying drawings illustrate several preferred embodiments of the present invention wherein.

DETAILED DESCRIPTION OF THE INVENTION

Figure 1:
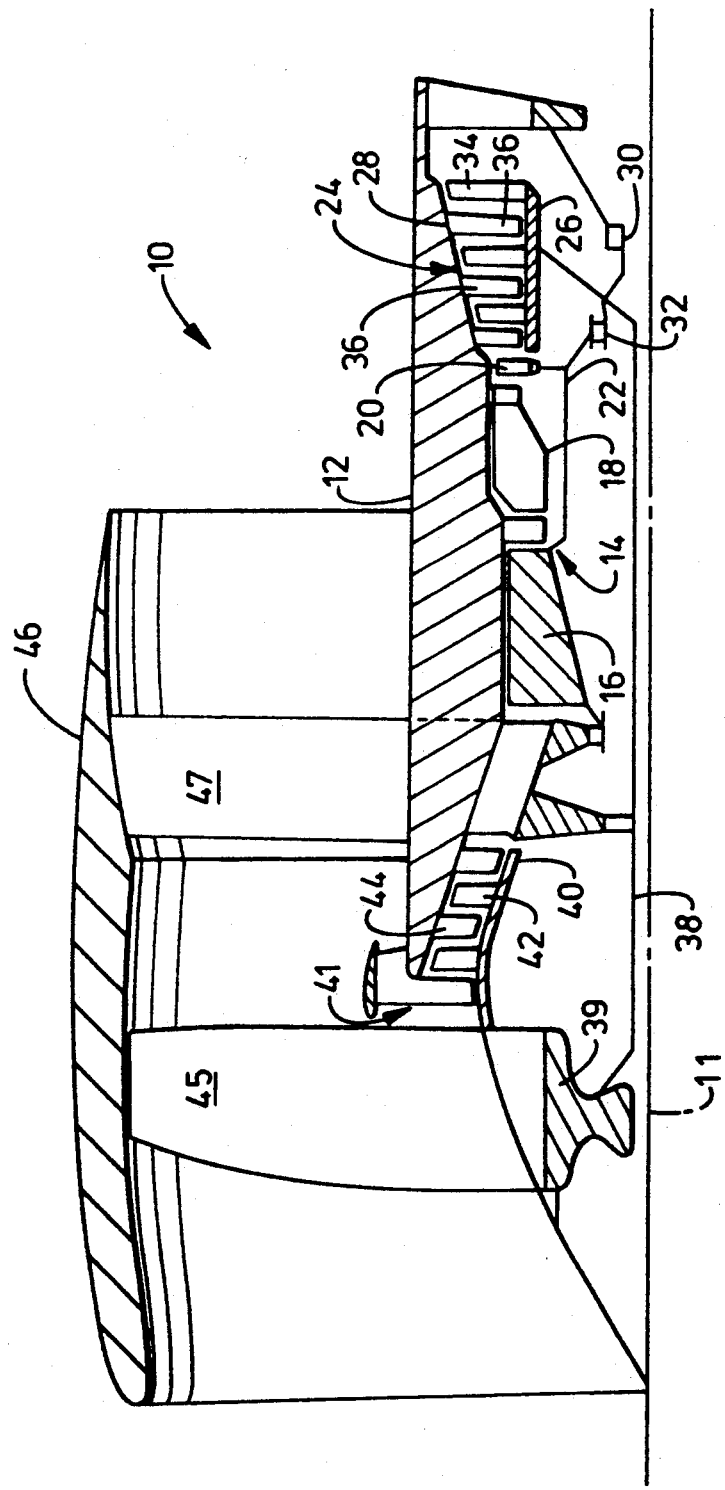
FIG. 1 is a schematic side view of a front fan gas turbine engine disclosing a preferred embodiment of the subassembly of the invention.

Referring now to the drawings, and particularly to FIG. 1, there is illustrated generally a front fan gas turbine engine, generally designated 10, which includes a first preferred embodiment of the invention as hereinafter described. The turbofan engine 10 has a longitudinal center line or axis 11 and an annular casing 12 disposed coaxially and concentrically about the axis 11. The turbofan engine 10 includes a core engine (also called a gas generator) 14 which is comprised of a high pressure compressor 16, a combustor 18, and a high pressure turbine 20, all arranged coaxially about the longitudinal axis or center line 11 of the turbofan engine 10 in a serial, axial flow relationship. An annular drive shaft 22 fixedly interconnects the high pressure compressor 16 and the high pressure turbine 20.

The core engine 14 is effective for generating combustion gases. Pressurized air from the high pressure compressor 16 is mixed with fuel in the combustor 18 and ignited, thereby generating combustion gases. Some work is extracted from these gases by the high pressure turbine 20 which drives the compressor 16. The remainder of the combustion gases are discharged from the core engine 14 into a low pressure or power turbine 24.

The low pressure turbine 24 includes an annular drum rotor 26 and a stator 28. The rotor 26 is rotatably mounted by suitable bearings 30 and includes a plurality of axially spaced turbine rotor blade rows 34 extending radially outwardly therefrom. The stator 28 is disposed radially outward of the rotor 26 and has a plurality of stator vane rows 36 fixedly attached to and extending radially inward from the stationary casing 12. The stator vane rows 36 are axially spaced so as to alternate with the turbine rotor blade rows 34. The rotor 26 is fixedly attached to drive shaft 38 and interconnected to drive shaft 22 via differential bearings 32. The drive shaft 38, in turn, rotatably drives a rotor disk 39 and an interconnected low pressure compressor (also called booster or booster compressor) drum rotor 40. The low pressure compressor rotor 40 forms part of a low pressure compressor 41 which also includes a plurality of low pressure compressor rotor blade rows 42 and low pressure compressor stator vane rows 44. The low pressure compressor rotor blade rows 42 are fixedly attached to and extend radially outward from the low pressure compressor rotor 40 for rotation therewith while the low pressure compressor stator vane rows 44 are fixedly attached to and extend radially inward from the stationary casing 12 (with the forward-most row also having a portion extending radially outward from the stationary casing 12). The low pressure compressor stator vane rows 44 are axially spaced so as to alternate with the low pressure compressor rotor blade rows 42. The rotor disk 39 supports a row of fan rotor blades 45 that is housed within a nacelle 46 supported about the stationary casing 12 by a plurality of fan struts 47, only one of which is shown.

Figure 2:
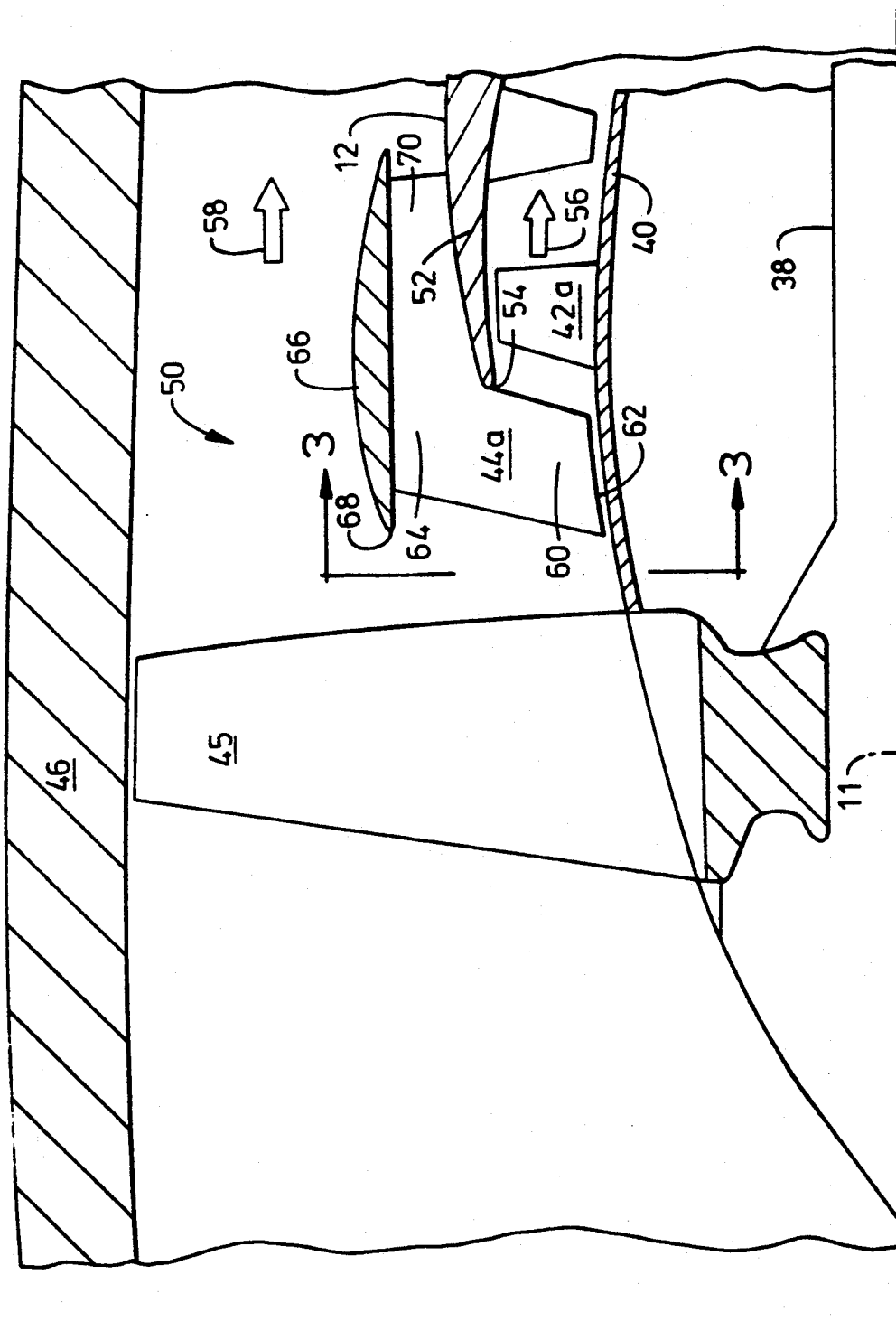
FIG. 2 is an enlarged view of the subassembly portion of FIG. 1.
Figure 3:
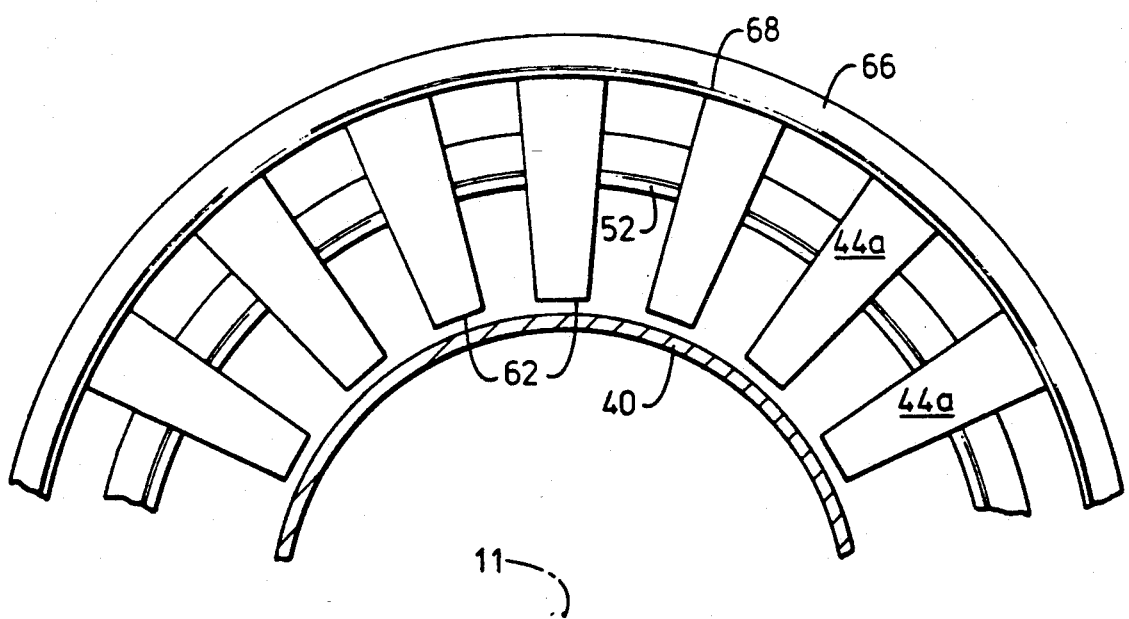
FIG. 3 is a sectional view of the gas turbine engine subassembly portion of FIG. 1 taken along lines 3—3 of FIG. 2.

Referring now to FIGS. 2 and 3 there is illustrated in more detail the first preferred embodiment of the gas turbine engine particle separator invention disclosed in FIG. 1. The front fan gas turbine engine subassembly 50 includes an aft-most row of generally radially outwardly extending full-size front fan rotor blades 45. Although only one row of fan rotor blades is shown in FIGS. 1 and 2, the invention is equally applicable to engines having one or more additional rows of fan rotor blades positioned longitudinally forward of the aft-most row of front fan rotor blades 45.

The subassembly 50 also includes a flow splitter 52 which is seen to be the longitudinally forward-most portion of the engine casing 12. The flow splitter 52 has a leading edge 54 disposed longitudinally aft of the fan rotor blades 45 for separating air exiting the fan rotor blades 45 into a core engine airflow 56 and a coaxially surrounding bypass airflow 58.

The engine 10 is seen to have a forward-most row of generally radially outwardly extending compressor rotor blades 42a disposed in the core engine airflow 56 longitudinally aft of the leading edge 54 of the flow splitter 52. Although the compressor rotor blades 42a are part of the low pressure compressor 41, they could be part of a high pressure or intermediate pressure compressor, depending on the particular design of the engine. The compressor rotor blades 42a are seen to be located longitudinally aft of, and radially inward of, the leading edge 54 of the flow splitter 52 as a consequence of those blades being disposed in the core engine airflow 56.

The subassembly 50 additionally includes a row of stator vanes 44a each having a first portion 60 disposed longitudinally adjacent, radially inward of, and longitudinally forward of the leading edge 54 of the flow splitter 52 and longitudinally adjacent the fan rotor blades 45. The row of stator vanes 44a is seen to be the forward-most row of compressor stator vanes. The stator vanes 44a are longitudinally adjacent the fan blades 45 (and the flow splitter's leading edge 54) in that there are no intervening blades, vanes, struts, and the like between the stator vanes 44a and the fan blades 45 (and the flow splitter's leading edge 54). For purposes of the invention, the terminology "stator vane" includes stationary radially inwardly extending stator vanes and those radially inwardly extending stator vanes which counterrotate with respect to the fan rotor blades, such counterrotation being known to those skilled in the art. It is noted that although the stator vanes 44a are depicted in FIG. 3 as being arrayed radially from the engine center line 11, in practice they may be leaned or curved somewhat (such as described in U.S. Pat. No. 3,536,414) to improve engine aerodynamic performance.

Preferably, the first portion 60 of the stator vanes 44a includes a generally radially inwardly extending blade tip 62. The blade tip 62 may be an integral blade tip or an attached abradable blade tip. However, the invention is equally applicable to engine subassemblies having such stator vanes secured at their radially inward ends to, for example, a stationary flowpath structure or to an inner ring which holds together such radially inward ends of the stator vanes.

In an exemplary design, the stator vanes 44a each have a second portion 64 which extends radially outward from, and longitudinally forward of, the leading edge 54 of the flow splitter 52. It is preferred that the subassembly 50 also include a generally longitudinally extending annular shroud 66 attached to the second portion 64 of the stator vanes 44a. Such shroud 66, being attached to the stator vane second portion 64, is necessarily disposed radially outward of the leading edge 54 of the flow splitter 52 and necessarily has a leading edge 68 which is disposed longitudinally forward of the leading edge 54 of the flow splitter 52. Since the shroud 66 is attached to the stator vanes 44a, the shroud 66 can be used to attach the stator vanes 44a to engine structure. For example, the shroud 66 can be directly attached to the fan struts 47 or can be indirectly attached to the flow splitter 52 by support vanes which are separate from the stator vanes 44a (such attachments not shown). Additionally, the generally longitudinally extending shroud may be tilted (not shown) with a more radially inward leading edge so as to generally match the slope of flow splitters found in practice, as can be appreciated by those skilled in the art.

In a further exemplary design, the stator vanes 44a each have a third portion 70 which extends radially outward from, and longitudinally aft of, the leading edge 54 of the flow splitter 52, with the third portion 70 being attached to the flow splitter 52. It is possible, though less desirable, to instead extend the third portion 70 aft and secure it to the fan strut 47. It is even possible to extend the stator vanes 44a (with or without a third portion 70) radially outward and secure them to the fan nacelle 46.

Figure 4:
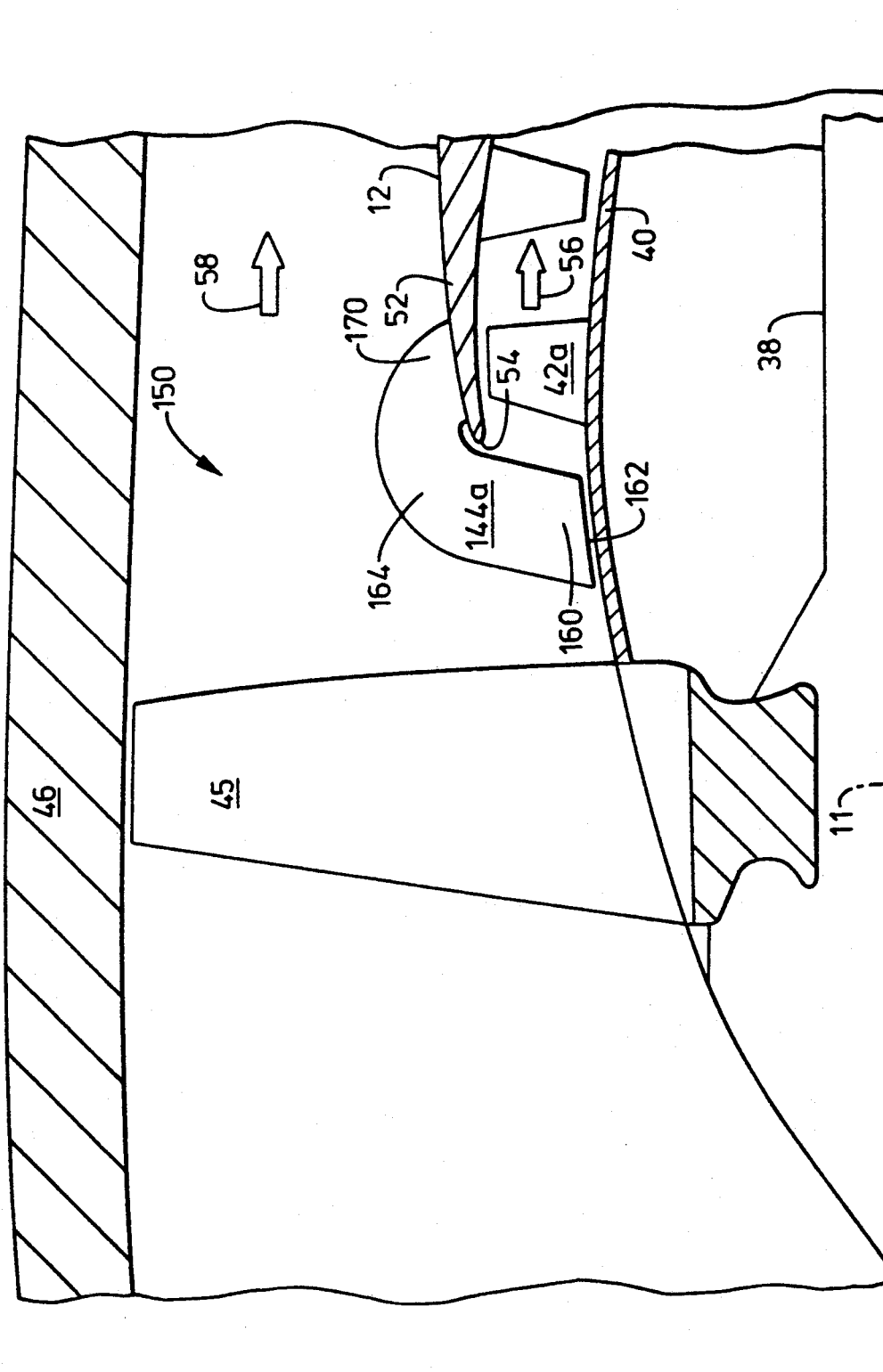
FIG. 4 is an enlarged schematic side view of another preferred embodiment of the subassembly of the invention.

Referring now to FIG. 4 there is illustrated a second preferred embodiment of the gas turbine engine particle separator invention. The front fan gas turbine engine subassembly 150 of FIG. 4 is seen to be identical with that of the first preferred embodiment of FIGS. 1-3 except that the stator vanes 44a of the first embodiment have been replaced with different stator vanes 144a of the second preferred embodiment. Stator vanes 144a have first, second, and third portions 160, 164, and 170 and blade tips 162 as do the stator vanes of the previously discussed first embodiment. However, stator vanes 144a of FIG. 4 do not have the previously discussed shroud 66. Therefore, the second portions 164 of stator vanes 144a are not interconnected. Stator vanes 144a are seen to have a profile of generally a hook with a curved end attached to the flow splitter 52. Other shroudless (or shrouded) stator vane profile shapes are possible, including those having an area (not shown) which is longitudinally aft and radially inward of, and attached to, the radially inner wall of the flow splitter. It is noted that for the purposes of this invention, the term "shrouded" or "shroudless" refers only to the status of the second portion of a stator vane and not to the status of the blade tip or some other area of the first portion of such stator vane.

Airfoil-shaped stator vanes 144a without an annular shroud serve to straighten the airflow exiting the fan rotor blades 45 for the compressor rotor blades 42a. Airfoil-shaped stator vanes 44a with an annular shroud 66 also serve to slightly compress the air flow exiting the fan rotor blades 45 (before further compression by the core engine airflow compressor rotor blades 42a), as is known to those skilled in the art.

In operation, particles exiting the fan rotor blades 45 have been shown by computer simulation to generally contain a radially outward component of velocity in addition to a longitudinally aft component of velocity, with many such particles clearing the flow splitter 52 to enter the bypass airflow 58 (instead of the core engine airflow 56) because, in the subassembly 50 and 150 of the invention, the flow splitter leading edge 54 has been moved longitudinally aft of the first portion 60 of the stator vanes 44a. Where the stator vanes 44a have an annular attached shroud 66 (see subassembly 50 of the first embodiment of the invention shown in FIGS. 1-3), reflection of particles from the shroud 66 into the core engine airflow 56 can be minimized. This can be done by locating the shroud 66 a sufficient distance radially outward from the flow splitter 52 such that particles of concern will be reflected from the shroud 66 onto the outer surface of the flow splitter 52 to join the bypass airflow 58, as can be appreciated by those skilled in the art.

Figure 5:
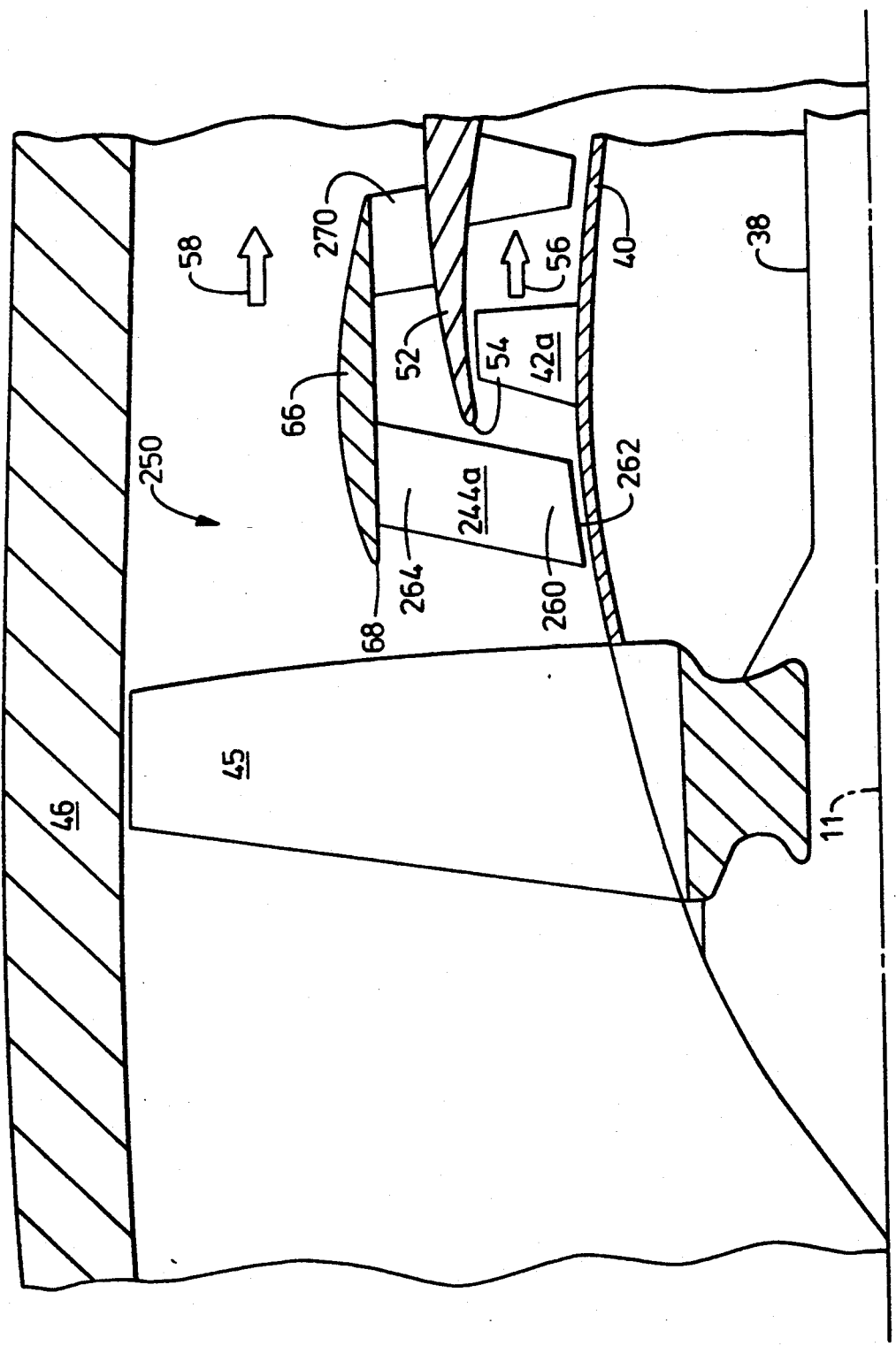
FIG. 5 is an enlarged schematic side view of an additional preferred embodiment of the subassembly of the invention.

FIG. 5 illustrates a third preferred embodiment of the gas turbine engine particle separator invention. The front fan gas turbine engine subassembly 250 of FIG. 5 is see to be identical with that of the first preferred embodiment of FIGS. 1-3 except that the stator vanes 44a of the first embodiment have been replaced with different stator vanes 244a of the third preferred embodiment. Stator vanes 244a have first and second portions 260 and 264 and blade tips 262 as do the stator vanes of the previously discussed first embodiment. However, stator vanes 244a of FIG. 5 do not have the previously third portions 70. Instead, the subassembly 250 additionally includes a plurality of attachment vanes 270 each having a radially outer end attached to the longitudinally aft portion of the shroud 66 and a radially inner end attached to the flow splitter 52. In this embodiment, the longitudinally forward portion of the shroud 66 is attached to the second portion 264 of the stator vanes 244a. In an exemplary design, the number of attachment vanes 270 is less than the number of stator vanes 244a.

The foregoing description of several preferred embodiments of the invention has been presented for purposes of illustration. It is not intended to be exhaustive or to limit the invention to the precise form disclosed, and obviously many modifications and variations are possible in light of the above teachings all of which are within the scope of the claims appended hereto.

We claim:

1. A front fan gas turbine engine subassembly comprising:
    (a) an aft-most row of generally radially outwardly extending full-size from fan rotor blades;
    (b) a flow splitter having a leading edge disposed longitudinally aft of said fan rotor blades for separating air exiting said fan rotor blades into a core engine airflow and a coaxially surrounding bypass airflow; and
    (c) a row of stator vanes each having:
        (1) a first portion disposed longitudinally adjacent, radially inward of, and longitudinally forward of said leading edge of said flow splitter and longitudinally adjacent said fan rotor blades;
        (2) a second portion which extends radially outward from, and longitudinally forward of, said leading edge of said flow splitter and which is shroudless; and
        (3) a third portion which extends radially outward from, and longitudinally aft of, said leading edge of said flow splitter and which is attached to said flow splitter.

2. The subassembly of claim 1, wherein said stator vanes have a profile of generally a hook.

* * * * *